(12) United States Patent
Arnold et al.

(10) Patent No.: US 8,566,913 B2
(45) Date of Patent: Oct. 22, 2013

(54) SECURE KEY MANAGEMENT

(75) Inventors: Todd W. Arnold, Charlotte, NC (US);
Elizabeth A. Dames, Concord, NC (US);
Carsten D. Frehr, Farum (DK);
Kenneth B. Kerr, New Paltz, NY (US);
Richard V. Kisley, Charlotte, NC (US);
Michael J. Kelly, Staatsburg, NY (US);
Eric D. Rossman, Wappingers Falls, NY (US); Eric B. Smith, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 13/100,357

(22) Filed: May 4, 2011

(65) Prior Publication Data

US 2012/0281837 A1 Nov. 8, 2012

(51) Int. Cl.
*H04L 29/06* (2006.01)

(52) U.S. Cl.
USPC ............................................. 726/5; 713/193

(58) Field of Classification Search
USPC ............................................. 726/5; 713/193
See application file for complete search history.

(56) References Cited

U.S. PATENT DOCUMENTS

| | | | |
|---|---|---|---|
| 4,941,176 A | 7/1990 | Matyas et al. | |
| 5,661,803 A | 8/1997 | Cordery et al. | |
| 6,104,810 A | 8/2000 | DeBellis et al. | |
| 7,660,421 B2 | 2/2010 | Hopkins et al. | |
| 8,254,571 B1 | 8/2012 | Boyen | |
| 2003/0163433 A1 | 8/2003 | Lam et al. | |
| 2003/0210791 A1 | 11/2003 | Binder | |
| 2004/0001595 A1* | 1/2004 | Hopkins et al. | 380/277 |
| 2004/0039925 A1 | 2/2004 | McMillan et al. | |
| 2004/0052377 A1 | 3/2004 | Mattox et al. | |
| 2006/0002549 A1 | 1/2006 | Avasarala et al. | |
| 2006/0177066 A1 | 8/2006 | Han et al. | |
| 2006/0242407 A1 | 10/2006 | Kimmel et al. | |
| 2006/0265338 A1 | 11/2006 | Rutkowski et al. | |
| 2007/0014399 A1 | 1/2007 | Scheidt et al. | |
| 2007/0127722 A1 | 6/2007 | Lam et al. | |
| 2007/0160201 A1 | 7/2007 | Blom et al. | |
| 2007/0189541 A1 | 8/2007 | Lam et al. | |
| 2007/0204158 A1 | 8/2007 | Hatashita et al. | |
| 2007/0217613 A1 | 9/2007 | Lam et al. | |
| 2008/0046732 A1 | 2/2008 | Fu et al. | |
| 2008/0065888 A1 | 3/2008 | Zheng et al. | |
| 2008/0070577 A1 | 3/2008 | Narayanan et al. | |
| 2008/0209221 A1 | 8/2008 | Vennelakanti et al. | |
| 2008/0298589 A1 | 12/2008 | Katar et al. | |
| 2009/0106551 A1 | 4/2009 | Boren et al. | |
| 2010/0158247 A1 | 6/2010 | Hopkins et al. | |
| 2011/0156873 A1 | 6/2011 | Choi et al. | |

OTHER PUBLICATIONS

U.S. Appl. No. 13/047,344, filed Mar. 14, 2011.

(Continued)

*Primary Examiner* — Christopher Brown
(74) *Attorney, Agent, or Firm* — Cantor Colburn LLP; Steven Chiu

(57) ABSTRACT

A system for secure key management is provided. The system includes a computer processor and an application configured to execute on the computer processor, the application implementing a method. The method includes populating a section of information associated with a key, the section of information being populated with information relating to a level of protection of the key accumulated over time. Secure key management further includes securely binding the section of information to the key, wherein the key is encrypted.

13 Claims, 7 Drawing Sheets

(56) References Cited

OTHER PUBLICATIONS

U.S. Appl. No. 13/095,226, filed Apr. 27, 2011.
U.S. Appl. No. 13/100,354, filed May 4, 2011.
U.S. Appl. No. 13/100,639, filed May 4, 2011.
U.S. Appl. No. 13/100,693, filed May 4, 2011.
U.S. Appl. No. 13/047,344, filed Mar. 14, 2011; Non-Final Office Action dated Dec. 7, 2012; 9 pages.
U.S. Appl. No. 13/100,354, Non-Final Office Action dated Dec. 4, 2012; 33 pages.
U.S. Appl. No. 13/047,344, filed Mar. 14, 2011; Final Office Action dated Mar. 29, 2013; 14 pages.
U.S. Appl. No. 13/095,226, filed Apr. 27, 2011; Non-Final Office Action dated Feb. 11, 2013; 36 pages.
U.S. Appl. No. 13/100,354, Final Office Action dated Mar. 27, 2013; 37 pages.
U.S. Appl. No. 13/100,639, filed May 4, 2011; Final Office Action dated Apr. 4, 2013; 14 pages.
U.S. Appl. No. 13/100,639, filed May 4, 2011; Non-Final Office Action dated Oct. 1, 2012; 15 pages.

* cited by examiner

FIG. 3

| 302 | 304 | 306 | 308 | 310 |
|---|---|---|---|---|
| Token Identifier | Reserved | Overall Token Length | Token Version Number | Reserved |

| Content example for AESKW wrapped payload: |
|---|
| Integrity Check Constant  602 |
| Bit Length of Padding  604 |
| Length of Hash Options  606 |
| Hash Options  608 |
| Hash of AD  610 |
| Clear Key Material  612 |
| Key padding  614 |

600

SECURE KEY MANAGEMENT

BACKGROUND

The present invention relates to data processing, and more specifically, to cryptography structures to enhance security of keys.

Keys may pass through a number of forms, and corresponding levels of protection, during the life cycle of the key. In cryptographic systems, knowledge of the current state, and corresponding protection level, of the key may be insufficient to determine if a key is suitable for a selected secure task.

SUMMARY

According to one embodiment of the present invention, a method for secure key management is provided. The method includes populating a section of information associated with a key, the section of information being populated with information relating to a level of protection of the key accumulated over time. The method further includes securely binding the section of information to the key, wherein the key is encrypted.

According to another embodiment of the present invention, a system for secure key management is provided. The system includes a computer processor and an application configured to execute on the computer processor, the application implementing a method. The method includes populating a section of information associated with a key, the section of information being populated with information relating to a level of protection of the key accumulated over time. The method further includes securely binding the section of information to the key, wherein the key is encrypted.

According to a further embodiment of the present invention, a computer program product for secure key management is provided. The computer program product includes a tangible storage medium readable by a processing circuit and storing instructions for execution by the processing circuit for performing a method. The method includes populating a section of information associated with a key, the section of information being populated with information relating to a level of protection of the key accumulated over time. The method further includes securely binding the section of information to the key, wherein the key is encrypted.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 depicts a block diagram of a header section of the token of FIG. 2;

FIG. 6 depicts a block diagram of a payload section of the token of FIG. 2; and

DETAILED DESCRIPTION

Exemplary embodiments of the invention provide for the secure management of keys (also called "key material") comprised of one or more key parts. Embodiments may use a token (also called "key tokens") or other suitable structure or device for key material management. An exemplary token is a data structure that can hold a complete or partial cryptographic key along with a key's management and usage information associated with the key. The exemplary embodiments create, utilize and update sections of the token structure to perform various tasks including management of the key and storing information relating to the key, including associated information related to creation of the key, acquiring the key and/or a level of key protection accumulated over time. By having the information securely bound to the key itself, the trustworthiness of the key can be established, thereby enabling the user to determine if the key is suitable for a selected task.

In an embodiment, the information associated with and bound to the key may be removed from the token by a secure module, described below, for accessing and updating the information within the secure module. After accessing the information and/or key, the information and key back are placed inside the secure key token before sending the token to a location outside the module. While being accessed inside the secure module the key and associated information (also called "key control information" or "associated data") section remain connected or bound to one another in some fashion.

It should be understood that the systems and methods for key management, including populating and updating the associated data section securely bound to the key, may be used for a structure including a key with a relationship with the associated data, metadata and/or information. The methods and systems utilize a suitable arrangement to securely bind the key to information that describes events that occur during the life of the key. One arrangement may utilize the key token structure described below.

Figure 1:
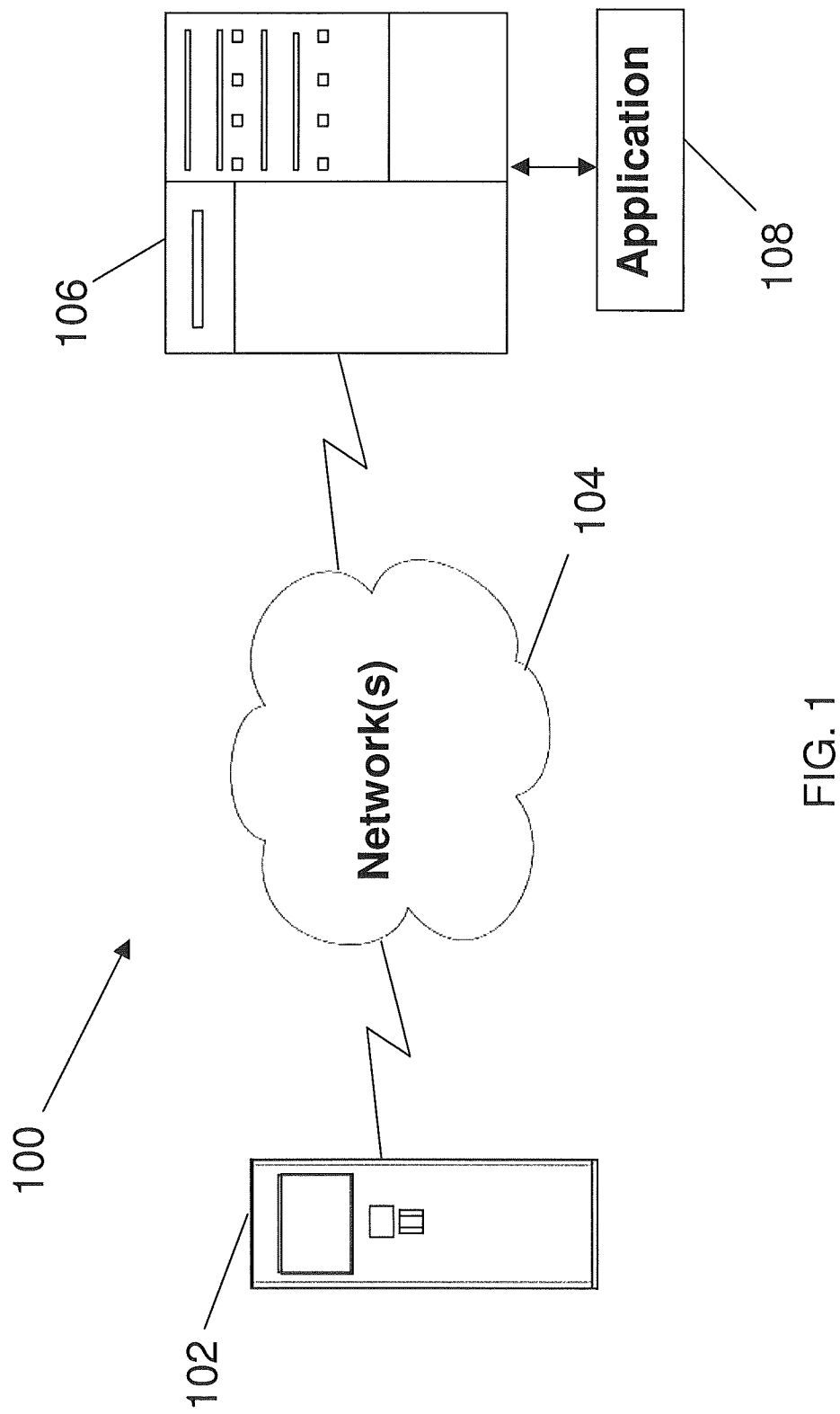
FIG. 1 depicts a block diagram of a system upon which secure key management methods may be implemented in an exemplary embodiment.
Figure 2:
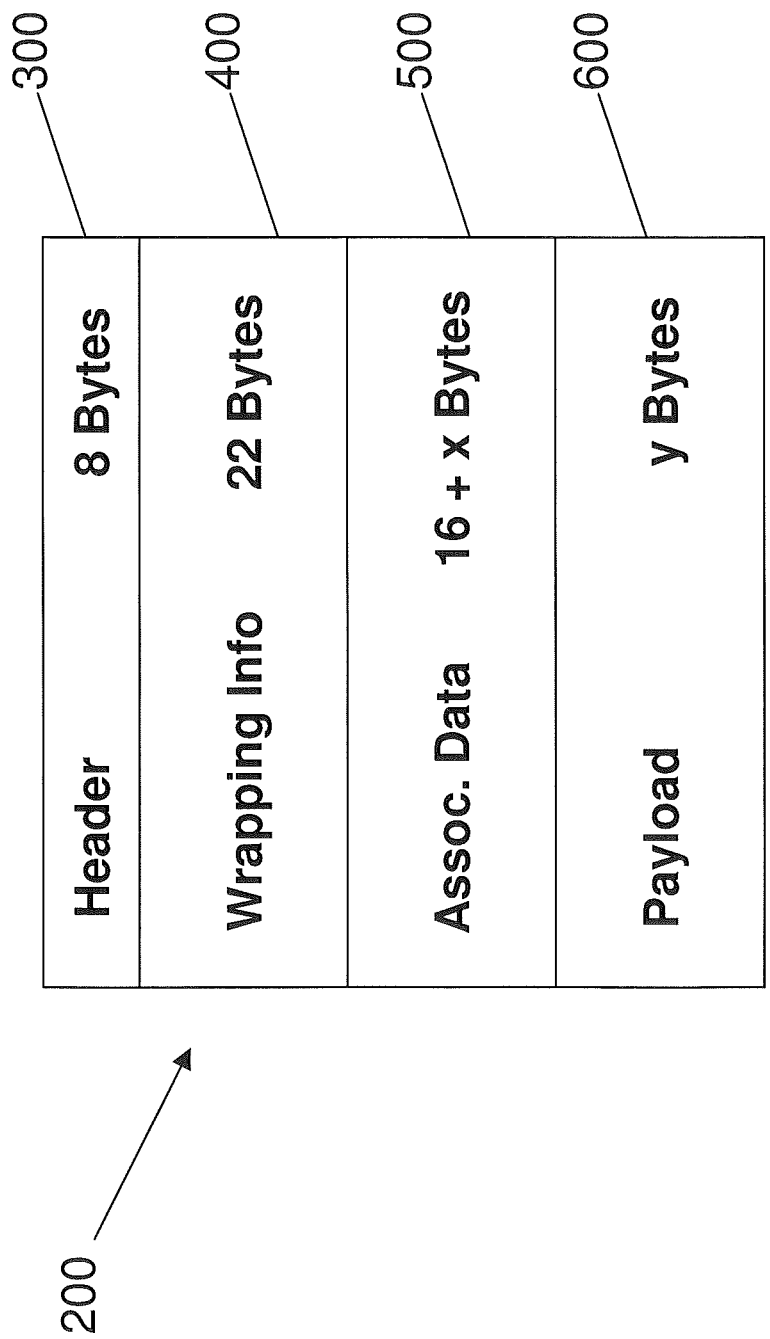
FIG. 2 depicts a block diagram of a token or data structure to manage key material.

With reference now to FIGS. 1 and 2, an exemplary system 100 and token 200 for providing secure key management will now be described. The exemplary system 100 creates, uses and/or transmits key tokens and/or key material. The system of FIG. 1 includes a user system 102 in communication over one or more networks 104 with a host system 106. The user system 102 represents a first party that submits key material to be communicated to a second party (e.g., the host system 106). The user system 102 may be a point of sale (POS) terminal that is implemented using a computer executing a computer program for carrying out the processes described herein. The user system 102 may include a hardware security module (HSM), such as a card, software and firmware configured to create, populate and manage the token 200 containing the key material as described herein. An HSM may be described as a piece of hardware and associated software/firmware that acts as a highly secure peripheral device, or secure cryptoprocessor, for the management of cryptographic keys and for the protection of sensitive data and applications.

In the depicted embodiment, an application 108 is used by the HSM on the host system 106 to create, populate and manage the token 200. The user system 102 may be a payment terminal, such as an automated teller machine (ATM) or kiosk, configured to receive user information, such as account information or account PIN. The host system 106 may be a financial institution connected to the user system 102 via one or more of the network(s) 104. The key material resides in a token in storage within the host system 106. The financial institution receives encrypted data from the terminal user system 102 over the network 104, which may include an account number and PIN information. Then the application 108 retrieves the key material from local storage and passes it into the HSM along with the received encrypted data. Inside the HSM, the token with the key material is unwrapped and the unwrapped key from the token is then used to decrypt the encrypted data from user system 102. The data can then be checked and verified, which is then communicated to the application 108. In one exemplary embodiment, the user system 102 includes hardware and software to execute computer instructions to create the token 200 that securely wraps the key material for local use or for transmission to another party, such as the host system 106. In another exemplary embodiment, the host system 106 executes computer instructions to create the token 200 that securely wraps the key material for local use or for transmission to another party, such as the user system 102.

The network(s) 104 may be any type of known networks including, but not limited to, a wide area network (WAN), a local area network (LAN), a global network (e.g. Internet), a virtual private network (VPN), and an intranet. The network 104 may be implemented using a wireless network or any kind of physical network implementation known in the art. The user system 102 may be coupled to the host system 106 through multiple networks (e.g., intranet and Internet). One or more user systems 102 and the host system 106 may be connected to the network 104 in a wired or wireless fashion. In one embodiment, the network 104 is an intranet and one or more user systems 102 execute a user interface application (e.g., a web browser) to contact the host system 106 through the network 104. In another exemplary embodiment, one or more of the user systems 102 is connected directly (i.e., not through the network 104) to the host system 106.

The host system 106 depicted in FIG. 1 may be implemented using one or more servers operating in response to a computer program stored in a storage medium accessible by the server. The host system 106 may include one or more hardware security modules (HSM), such as a card, software and firmware configured to create and manage tokens containing the key material as described herein.

The exemplary secure key management methods and structures may be created and performed by components of the system 100 of FIG. 1.

The token 200 may reside locally on and be created by the host system 106 or user system 102. For example, the user system 102 may include a token 200 containing key material used to encrypt account data to send to the host system 106. In this embodiment, the token 200 is a data structure that includes several sections (e.g., sections 300, 400, 500 and 600) dedicated to selected tasks such as describing the token and key material. A header section 300 includes data used to interpret fields within sections of the token 200. The exemplary header section 300 is a fixed-size section of the token 200. A wrapping information section 400 is also a fixed-size section that contains information pertinent to how (and if) the key material in a payload section 600 is wrapped. The wrapping information section 400 also includes information about how the key material in the payload section 600 is securely bound to the information in an associated data (AD) section 500. The associated data section 500 may also be described as a key control information section, wherein the section contains fields configured to store various types of information, such as a user-defined data to be associated with the key material. The associated data section 500 is a variable-size section that has a small fixed-size portion with some descriptive fields for the key material itself, along with length fields for the variable-size portions of this section.

The payload section 600 is where the key material resides in a selected state. In an example, there are three states, including (1) not present, (2) clear and (3) encrypted/bound. In the not present state, the token is a "skeleton" which contains descriptive and policy information in a useful template that can be populated into a specific token with key material at a later time. The clear state may be used for testing purposes or low security applications, where it is useful to support tokens that have unencrypted key material. In the encrypted/bound state, the key material is accompanied with pre-pended and/or post-pended data (key binding material). The key material and pre-pended or post-pended data conforms to and is wrapped using a supported wrapping method indicated by token fields within the wrapping information section 400. The exemplary token 200 enables wrapping of the token sections via a suitable wrapping method, as described below, without altering the token 200 structure. Specifically, the structure of the header 300, wrapping information 400 and associated data 500 sections will not change based on the chosen wrapping method.

The sections of the exemplary token 200 may have fixed or variable sizes. For example, the header section 300 has the fixed size of 8 bytes and the wrapping information section 400 has the fixed size of 22 bytes. The associated data section 500 has an overall variable size composed of the fixed-size portion of 16 bytes plus a sum of variable-sized other portions of the section. Similarly, the payload section 600 has a variable-size depending on the state of the key material. Exemplary payload sizes include: 0 bits for tokens with no key material; the length of the key itself for unencrypted key material; and the length of the key plus the length of the key binding material for tokens that include encrypted key material.

Turning now to FIG. 3, the exemplary header section 300 of the token 200 will now be described. The header section 300 includes several fields used to describe aspects of the token 200. A token identifier field 302 indicates broad token type information to aid processing of the token 200. Token types that may be listed in the token identifier field include internal tokens for local use, external tokens for sending to another party, or zero token types, depending on usage needs and application requirements. A zero token is typically a placeholder, which may be a string of one or more bytes with all zero bits in the first byte, which is passed into an application program interface in a position that a full token is expected in return. A reserved field 304 is set aside for future use. An overall token length field 306 indicates the entire length of the token 200, including the header section 300. A token version number field 308 describes a version of the token 200, which separates this token from legacy token structure types supported by systems from the same manufacturer as the current system 100. This enables the system 100 to access and use current and legacy token types on the same machines. A reserved field 310 is also set aside for future use.

Figure 4:
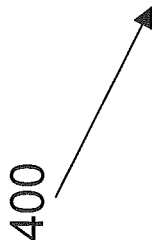
FIG. 4 depicts a block diagram of a wrapping information section of the token of FIG. 2.

FIG. 4 shows the exemplary wrapping information section 400 which includes fields to describe how the key material in the payload section 600 is wrapped and secured to the associated data section 500 (key control information). A key material state field 402 describes a state of the key material in the payload section 600. Possible states include: no key present; the key is clear; the key and a representation of the key control information, such as a hash, is encrypted under a Key Encrypting Key (KEK); and the key and a representation of the key control information, such as a hash, is encrypted under the secret Master Key (MK) that stays in the HSM.

In the no key present state, the token is a "skeleton" which contains descriptive and policy information in a useful template that can be populated into a specific token with actual key material at a later time. The clear state is used for testing purposes or low security applications. In the encrypted state of KEK and MK, the key material is wrapped and bound by key binding material. The states available in the key material state field 402 are limited by the token identifier field 302, wherein an external token identifier may have a key material state of no key, a clear key or a KEK encryption. Similarly, an internal token identifier may have a key material state of no key, a clear key or an MK encryption. Accordingly, the KEK key material state is used to send the key material to another party, whereas the MK key material state is used locally by a host application.

With continued reference to FIG. 4, the wrapping key verification pattern (KVP) type field 404 specifies the calculation method, such as a cryptographic hash algorithm (also referred to as "hash algorithm"), to apply to the MK or KEK (as described in key material state field 402) used to wrap the payload field 600. The output of the calculation is then compared to the content of a wrapping KVP value field 406 to verify that the correct key has been identified as wrapping the payload section 600. If the values do not match, then the wrong key has been provided and the user is notified of the error. The KVP type field 404 and wrapping KVP value field 406 are not used if the key material state is no key or clear key.

A wrapping method field 408 is used to describe the payload section 600 wrapping method and how it is bound to the associated data section 500. In an embodiment, the user selects, via the HSM, the wrapping method to use when the token 200 is created. This wrapping method can include the layout of the payload section 600, the logical operations to perform on the key used for encryption, such as KEK or MK, and what steps to do with the key used for encryption to make up the final payload section 600, such as additional encryption steps or operations to bind associated data into the secure payload. The logical operations to perform on the key used for encryption are various steps performed in wrapping the payload section 600. As many as 255 wrapping methods can be described. In one embodiment, four values are assigned to corresponding wrapping methods. Examples of wrapping methods include advanced encryption standard key wrap (AESKW) or a public key encryption scheme that combines algorithms, such as RSAES (Rivest Shamir Adelman Encryption Scheme) with OAEP (Optimal Asymmetric Encryption Padding).

A hash method field 410 describes a hash algorithm applied to the associated data section 500, wherein the resulting hash value is then compared to a stored hash value (field 610) in the payload section 600. This check against the stored value is a mechanism to indicate if the associated data section 500 has been altered. A reserved field 412 is set aside for future use.

Figure 5:
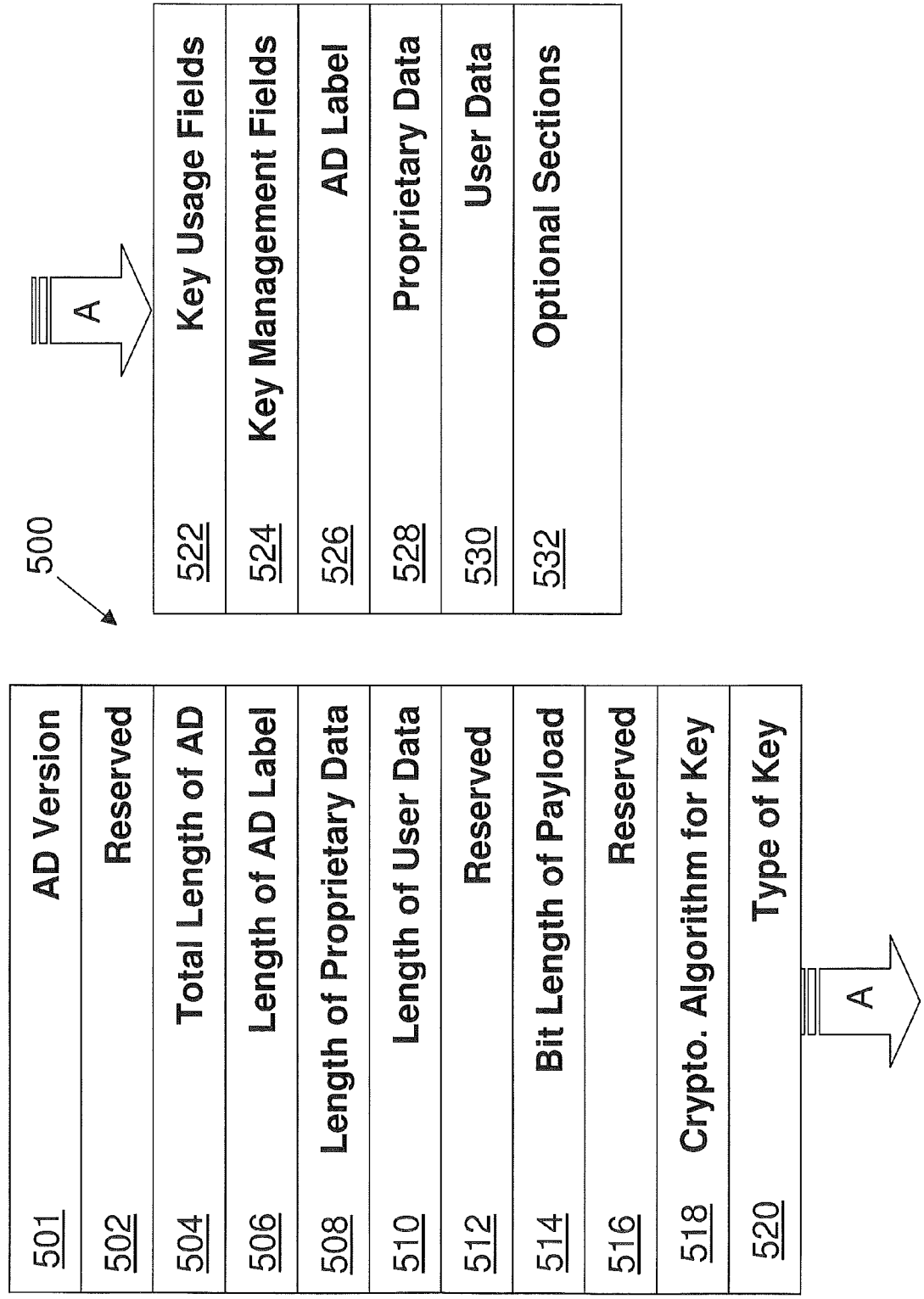
FIG. 5 depicts a block diagram of an associated data section of the token of FIG. 2.

Referring now to FIG. 5, the exemplary associated data (AD) section 500 (also referred to as "key control information section" or "associated information section") includes fields used to describe attributes of the key material and other fields to describe field sizes in this section. An AD version field 501 is used to identify the version of the current AD section 500, thus allowing for future expansion as well as support across multiple versions and layouts. A reserved field 502 is set aside for future use. In addition, reserved fields, in this and other sections, may be utilized to enable alignment of data in the section. A total length of AD field 504 describes the size of the AD section 500, thereby enabling the section to vary in size. A length of AD label field 506 describes the size of an optional AD label field 526 that is passed by the user. In an example, this field gives the label length in bytes wherein the length is either 64 or 0. A length of proprietary data field 508 describes a length in bytes of an extensible proprietary data field 528 (0-255) contained in the AD where the data is placed by the manufacturer of the HSM (either where the token is created or currently resides), such as control and tracking data outside the other data fields. A length of user data field 510 describes the size of an extensible user data field 530, wherein the user can populate the variable length field (0-255) via a provided interface, such as an API for the system. A reserved field 512 is set aside for future use.

A bit length of payload field 514 describes the length of the payload section 600 in bits, which is important for certain wrapping methods used to protect the payload. A reserved field 516 is set aside for future use. A cryptographic algorithm identified in key field 518 indicates which supported cryptographic algorithm can be used with the encrypted key material in the payload. Examples of the algorithm include those used with the following standards: AES, data encryption standard (DES), RSA, Elliptic Curve and message authentication code (MAC). A type of key field 520 defines the categories for use of the key material with the algorithm from field 518. Categories of use are broad and include cipher key, importer KEK, exporter KEK, and MAC. Key usage fields (KUFs) 522 are a variable length and extensible field or set of fields that define narrower attributes for the key type defined in 520. Exemplary attributes in the key usage fields 522 describe how the key material can be used and/or limits actions that may be performed in various situations available for this key type. For example, if the key material is an AES key for importing or exporting other keys, it can be used as a wrapping key for exporting other AES keys from this HSM or as an unwrapping key to import other AES keys into this HSM. In another example, if the key material is a cipher key, the key usage fields 522 can further limit key material use to enciphering or deciphering. A plurality of usage description fields may be placed in the set of key usage fields 522. Accordingly, the key usage fields 522 vary in size and interpretation based on other fields, such as fields 518 and 520. The exemplary key usage fields 522 are in the following format—one byte: count of fields that follow this byte; two bytes each: fields with key usage fields data.

Still referring to FIG. 5, key management fields (KMFs) 524 are a variable length and extensible field or set of fields that define attributes of the key material wrapped in the token, including but not limited to what type of KEKs can be used to wrap this key material (if any), whether the wrapped key material is complete or expects more user contributed material, how the key was created, how the key was acquired by the current module and information relating to the protection of the key over time. Other examples of attributes include limiting what can be done to the key material, such as limiting distribution or export of the key material, such as a cipher key, after receipt of the key material by a party. The number of attributes or entries in the key management fields 524 is variable. The key management fields 524 vary in size and interpretation based on other fields, such as fields 518 and 520. Exemplary key management fields 524 are in the following format—one byte: count of fields that follow this byte; two bytes each: fields with key management fields data. In an embodiment, described in further detail below, exemplary key management fields 524 include fields that allow user policies to be implemented to manage and record the entire key material life cycle and are extensible to register key history and policies for the remaining key life cycle. For example, the fields allow updating of life cycle information after receiving the key material. Further, policies may be created after receipt to specify when the key material is to be retired or allowable methods for wrapping the key material itself.

As discussed above, the AD label field 526 is a user specified optional field that gives a meaningful name to the token 200. An exemplary AD label field 526 is 64 bytes. The label is within the token 200, thereby enabling recovery of the label via field 526. Further, the AD label field is securely bound to the key material due to being wrapped as part of the AD section 500 with the key material. In addition, since the label is unencrypted, it can be used by the host system to check if the user is authorized to use the key token. The proprietary data field 528 is for the HSM provider to include their own data or identifiers, which will be securely bound to the key material if an appropriate wrapping method is selected. The user data field 530 is for user populated data and may hold data as designated by the HSM-using host application. Accordingly, the user populates the data using an interface on a host application. The optional sections fields 532 allow for further extensibility of the token 200 at the discretion of the HSM-using host application or the HSM manufacturer. Each optional section field is in the format of unique identifier, length (must include length of identifier and length fields) and an optional data section.

Referring now to FIG. 6, the exemplary payload section 600 may have no content, or may not be wrapped (key material is here by itself and is not encrypted). If the payload section 600 contains wrapped content then fields 408 and 410 can be used to interpret the payload contents and the method for using the appropriate KEK or MK to unwrap the payload. As stated above, the payload section 600 layout depends on the wrapping method chosen, such as AESKW or RSAES-OAEP wrapping methods. Moreover, the structure and layout of the header section 300, wrapping information section 400, associated data section 500 and payload section 600 are independent and remain the same as the wrapping method for the token 200 and payload section 600 are changed. As an example, the AESKW wrapping method and corresponding payload layout will be described.

The integrity check constant value field 602 includes a known constant that is used to determine if the unwrap succeeded before looking at other fields in the section. If the constant is not correct then the payload and/or its associated data were corrupted or modified in some way outside the control of the HSM. The corruption or modification is then alerted to the user. A bit length of padding field 604 is used to describe if there is padding and the size of padding, depending on the bit length of the key material in the payload. Thus, this field indicates how much padding to remove. A length of hash options field 606 describes the length of a hash options field 608. The hash options field 608 describes various options that may be used in computing the hash of AD field 610, while still conforming to the AESKW standard. The hash of AD 610 is the hash value of the AD section 500, used to verify that the section has not been altered. A clear key material field 612 contains the key material or secret key that is carried in the payload section 600. A key padding field 614 is used to pad the key material and depends on the size of the key material in field 612.

In embodiments, the key in the token 200 is created outside of or within a local system, such as host system 106 (FIG. 1). The host system 106 includes a secure module, such as an HSM, wherein creation of the key within the secure module provides a user with knowledge of the key's protection level from the time of it's creation. Therefore due to the access to the history of the key's protection level, the trustworthiness of the key can be simply established, enabling the user to decide what actions, tasks and/or applications are appropriate for the key.

In embodiments where the key is created outside the local system, the key protection level prior to entry into the local system may be unknown. The unknown level of key protection would not indicate if an exposure of the key has occurred outside the HSM. Therefore, the unknown key protection level reduces the trustworthiness level of the key, limiting the number of tasks or actions that the key is appropriate for. Embodiments of the key and information related to the key using the key token structure described above provide information relating to the key creation as well as information about how the key was imported. Further, the information (i.e., associated data section) may include a cumulative record of the protection level of the key over time. Systems and processes that utilize keys and structures that provide this information enable the user to ascertain the trustworthiness of the key and limit use of the key based on the information provided. Accordingly, the associated data section (key control information or key control information section) securely bound to the key provides enhanced security for the key. In an embodiment, operations to access and populate the associated data section are only performed within the secure module, thus ensuring that the associated data section cannot be altered by an unauthorized party. In an embodiment, the associated data section may be in the clear or may be encrypted, but may not be altered outside the HSM.

Embodiments of the secure system, such as system 100 (FIG. 1), are discussed below where the system manages keys and stores the associated information relating to the key protection level, the key creation and/or the acquisition of the key by the local system. In an embodiment, the system 100 includes a secure module, such as an HSM, in the host system 106. The HSM in the host system 106 is configured to access the key and associated information that are securely bound together as part of token 200. Exemplary systems and methods may use any suitable data structure, token and/or hardware to provide a secure binding between the key and the associated information, wherein the information is updated within the HSM. For ease of explanation, the method and system below will be described with reference to the token 200 of FIGS. 2-6, although any suitable structure or token configuration may be used.

Figure 7:
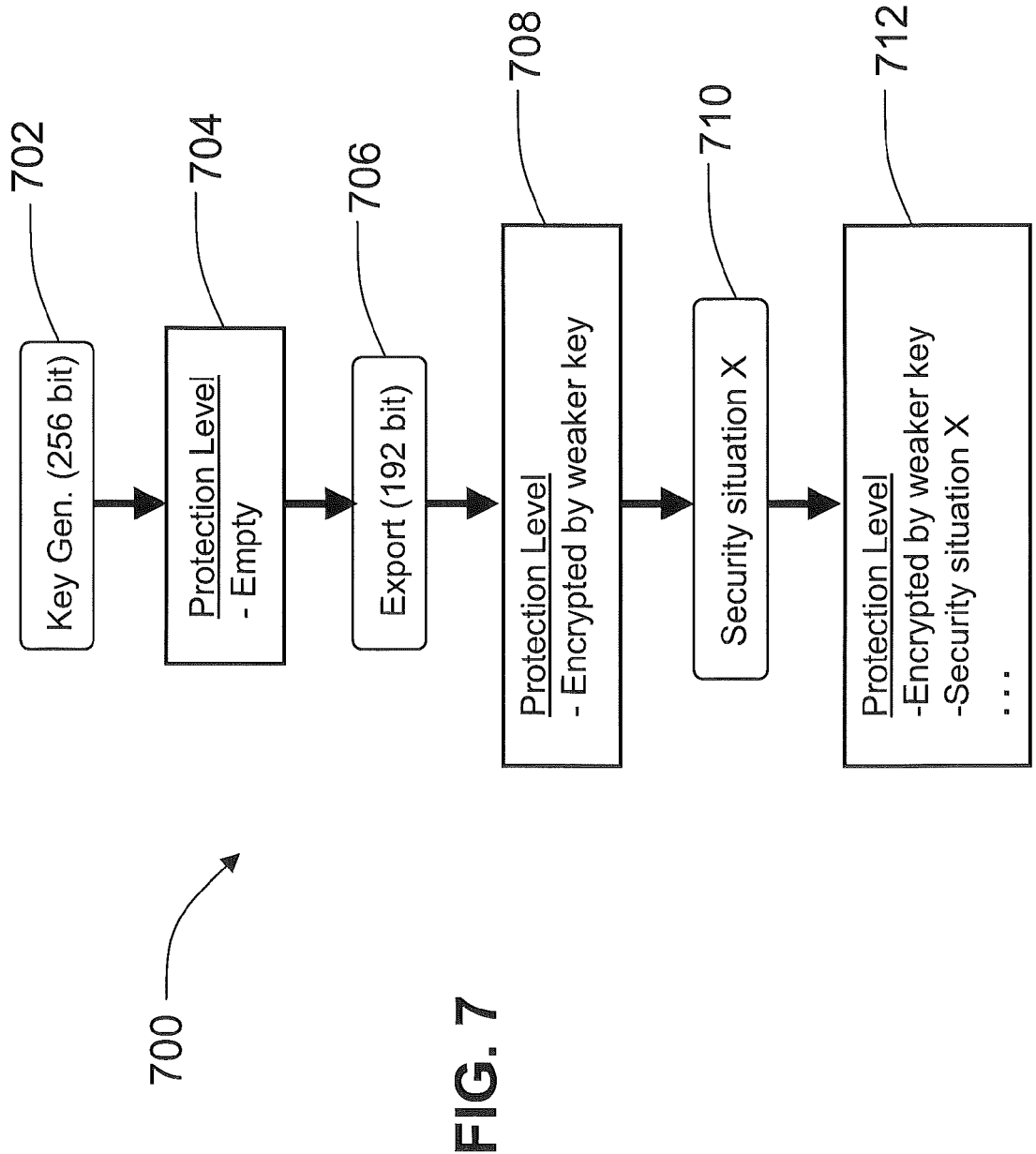
FIG. 7 depicts a block diagram illustrating an exemplary process for an exemplary system for storing information relating to a level of protection of a key accumulated over time.

FIG. 7 is a block diagram illustrating an exemplary process 700 for an exemplary system for storing information relating to a level of protection of a key accumulated over time, wherein the information is securely bound to the key itself. In an embodiment, the key and associated information are securely bound via a suitable structure, such as the key token 200, where the associated information is stored in the key management field 524 of the associated data section 500. In a first block 702, an exemplary key is generated on a secure module, such as an HSM. In an embodiment, the key is generated as a 256 bit long key. Further, in an embodiment, the key is also encrypted by a 256 bit long master key. In the secure module using a suitable structure that supports storing the associated information, such as the key token 200, the associated information is stored in the key management fields 524 of the AD section 500 of the key token 200. The key management fields 524 are extensible and thereby enable storing of a variety of information describing the use and history of the key.

In the example, the associated information relating to the key protection level after generation is shown in a block 704. As shown in block 704, there are no entries (i.e. "empty") for the key protection level. In an embodiment, situations or records are entered in the key management field 524 of the AD section 500 (associated information section) when there is an exposure of the key. A key exposure occurs when the key is not protected or is protected by a weaker encryption than the key has on the key generating or originating system (and associated HSM). Examples of exposures include, but are not limited to, having the key in the clear or unprotected outside the secure module or an encryption of the key that is less protective than the key's encryption inside the generating system. In a block 706, the key is exported from the secure module of the generating system. The key is decrypted using the 256 bit master key as it is exported, and is then encrypted by another key for export. In the depicted example, the key is encrypted by a key that is 192 bits long, thereby meaning that the key is encrypted by a key that is actually shorter than the 256 bit key itself, thereby causing a security exposure. Accordingly, a block 708 shows that the exposure is stored in the key management field 524 or associated information section. The entry shows that the key has been encrypted by a weaker key, which indicates key exposure or reduced protection level for the key.

In a block 710 the key is exposed by another security situation "X", wherein the situation caused key exposure and a reduced protection level for the key. Accordingly, in a block 712, the security situation X (also referred to as "record of key exposure") is stored in the associated information section (i.e., KMF 524). As shown, the associated information section stores accumulated information related to the protection level of the key over time. Accordingly, the associated information section includes the following entries: (1) Encrypted by weaker key; (2) Security situation X. Thus, as the key passes through different forms and systems during the key's life cycle, the associated information section stores key protection level information to indicate key exposure. The associated information is securely bound to the key itself by any suitable arrangement, including the key token 200, thereby enabling a user or system to determine a key's protection level history. The user can then determine a trustworthiness of the key based on the protection level information as well as other key information in the associated information section. In embodiments, the key's trustworthiness enables the system and user to determine actions and applications that the key is suitable for based on the protection level information accumulated over time. The process 700 of maintaining the key protection level history may continue for any number of key protection level situations that occur over time for and may include storing any suitable information relating to the key's protection over time.

Non-limiting examples of key exposures or security situations (key protection level information) that may be stored in the associated information section include: the key was unprotected or in the clear; the key was wrapped with a key weaker than itself; the key was wrapped with a key that is not trusted; the key has been wrapped without key-type information bound securely to the key (i.e., used to indicate a specific purpose for the key); the key was encrypted using an insecure ciphering mode (such as those prohibited by industry standards) and any suitable recognized type of key exposure. The cumulative key protection level information is stored in a structure that securely binds the information to the key. Thus, the key's security history for the key's life cycle is easily accessed by users to determine key trustworthiness.

In embodiments, the associated information, including key protection level information, is securely bound to the key when outside a secure module in the key token 200. Further, the AD section 500 (i.e., associated information section) is not encrypted, thereby enabling access to the information when outside the secure module as part of the key token 200. In an embodiment, the associated information and key protection level information can only be populated and altered within the secure module, thereby preventing tampering by unauthorized parties. In embodiments where the key is passed to a system or structure that does not support maintaining key protection level information, the key protection level information is either lost or not maintained while still being present in the unsupported system. Further, when a key is imported from a non-supporting structure or system to a system with the key token 200, the key protection level information is stored starting when the key is imported.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer program product for secure key management, the computer program product comprising:
   a non-transitory computer readable storage medium readable by a processing circuit and storing instructions for execution by the processing circuit for performing a method, comprising:
   populating a section of information associated with a key, the section of information being populated with information relating to a level of protection of the key accumulated over time, the information relating to the level of protection of the key further comprising records of key exposure that describe events that occur during a life of the key;
   the records of key exposure comprise at least one of the following: the key being unprotected, the key being wrapped with a second key weaker than the key, the key being wrapped with a key that is not trusted, the key being wrapped without key-type information bound to the key, and the key being encrypted using an insecure ciphering mode; and securely binding the section of information to the key, wherein the key is encrypted.

2. The computer program product of claim 1, wherein the section of information associated with the key is located in a key token when outside a secure module and is not encrypted when outside the secure module.

3. The computer program product of claim 2, wherein the key is encrypted in the key token when outside the secure module.

4. The computer program product of claim 1, wherein populating the section of information associated with the key comprises populating a key control information section located in a key token when outside a secure module, the key token including the key.

5. The computer program product of claim 4, wherein populating the key control information section comprises populating a key management field in the key control information section.

6. The computer program product of claim 1, comprising enabling an action for the key based on the information relating to the level of protection.

7. The computer program product of claim 1, wherein the section of information comprises extensible fields.

8. A system for secure key management, comprising:
a computer processor; and
an application configured to execute on the computer processor, the application implementing a method, the method comprising:
populating a section of information associated with a key, the section of information being populated with information relating to a level of protection of the key accumulated over time, the information relating to the level of protection of the key further comprising records of key exposure that describe events that occur during a life of the key;
the records of key exposure comprise at least one of the following: the key being unprotected, the key being wrapped with a second key weaker than the key, the key being wrapped with a key that is not trusted, the key being wrapped without key-type information bound to the key, and the key being encrypted using an insecure ciphering mode; and
securely binding the section of information to the key, wherein the key is encrypted.

9. The system of claim 8, wherein the section of information associated with the key is located in a key token when outside a secure module and is not encrypted when outside the secure module.

10. The system of claim 9, wherein the key is encrypted in the key token when outside the secure module.

11. The system of claim 8, wherein populating the section of information associated with the key comprises populating a key control information section located in a key token when outside a secure module, the key token including the key.

12. The system of claim 11, wherein populating the key control information section comprises populating a key management field in the key control information section.

13. The system of claim 8, comprising enabling an action for the key based on the information relating to the level of protection.

* * * * *